United States Patent
Wilber et al.

(10) Patent No.: US 7,183,713 B2
(45) Date of Patent: Feb. 27, 2007

(54) AUXILIARY COIL DRIVER CIRCUIT FOR A CATHODE RAY TUBE

(75) Inventors: James Albert Wilber, Indianapolis, IN (US); Joseph Curtis Stephens, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 10/511,837

(22) PCT Filed: Apr. 16, 2003

(86) PCT No.: PCT/US03/11965

§ 371 (c)(1),
(2), (4) Date: Oct. 19, 2004

(87) PCT Pub. No.: WO03/090447

PCT Pub. Date: Oct. 30, 2003

(65) Prior Publication Data

US 2005/0231135 A1    Oct. 20, 2005

Related U.S. Application Data

(60) Provisional application No. 60/373,874, filed on Apr. 19, 2002.

(51) Int. Cl.
*H01J 29/41* (2006.01)
*H01J 25/34* (2006.01)
(52) U.S. Cl. .......................... 315/12.1; 315/8
(58) Field of Classification Search ............ 315/8, 315/11, 12.1, 364, 367, 368.27
See application file for complete search history.

(56) References Cited

U.S. PATENT DOCUMENTS

| | | | |
|---|---|---|---|
| 4,344,021 A * | 8/1982 | Johnston ............... 315/383 |
| 4,388,619 A | 6/1983 | Beck | |
| 4,472,707 A * | 9/1984 | Wilensky et al. .......... 345/14 |
| 4,963,789 A | 10/1990 | Buhler | |
| 5,015,915 A | 5/1991 | Hartmann et al. | |
| 5,168,195 A | 12/1992 | Breidigan et al. | |
| 5,442,290 A * | 8/1995 | Crooks ................ 324/309 |
| 5,587,631 A | 12/1996 | Wilber et al. | |
| 5,739,638 A | 4/1998 | Wilber et al. | |
| 5,847,511 A | 12/1998 | Lee | |
| 6,013,989 A * | 1/2000 | Lee ..................... 315/371 |
| 6,392,369 B1 * | 5/2002 | Kim ..................... 315/367 |
| 6,574,307 B1 * | 6/2003 | Anderton ............... 378/98.7 |

OTHER PUBLICATIONS

Copy of search report dated Jun. 15, 2003.

* cited by examiner

*Primary Examiner*—Shih-Chao Chen
*Assistant Examiner*—Minh Dieu A
(74) *Attorney, Agent, or Firm*—Joseph J. Laks; Harvey D. Fried; Christine Johnson

(57) ABSTRACT

A magnetic field compensation winding arrangement for a cathode ray tube includes a magnetic field compensation winding positioned on the cathode ray tube to compensate for an ambient magnetic field. An operational amplifier is used for generating a magnetic field compensation current in the winding. A pair of digital-to-analog converters are used for generating a pair of signals, respectively, that are coupled to the amplifier to control the magnetic field compensation current.

7 Claims, 2 Drawing Sheets

AUXILIARY COIL DRIVER CIRCUIT FOR A CATHODE RAY TUBE

CROSS REFERENCE TO RELATED APPLICATIONS

This application claims the benefit, under 35 U.S.C. § 365 of International Application PCT/US03/11965, filed Apr. 16, 2003, which was published in accordance with PCT Article 21(2) on Oct. 30, 2003 in English and which claims the benefit of U.S. Provisional Patent Application No. 60/373,874, filed Apr. 19, 2002.

BACKGROUND OF THE INVENTION

The invention relates to a bus controlled arrangement for a video apparatus. In particular, the invention relates to an arrangement for adjusting a current in a winding mounted on a cathode ray tube (CRT) to compensate for the earth's magnetic field.

U.S. Pat. No. 5,168,195, entitled, MAGNETIC FIELD COMPENSATION APPARATUS, in the names of Breidigan, et al. describes a compensating coil for a scanning electron beam display, such as a color television tube, that reduces undesirable deflection of the electron beams due to ambient magnetic fields, in particular the geomagnetic field. The coil has a winding disposed to encircle the tube neck, perpendicular to the Z axis. A degaussing coil is positioned on the tube envelope to provide for demagnetizing metal structures within the envelope. In order to provide more complete degaussing, the supply current to the compensating coil is interrupted during the degaussing operation.

U.S. Pat. No. 5,739,638, in the name of Wilber et al., entitled Bus controlled arrangement using a duty cycle modulated control signal in a CRT, describes an arrangement using a microprocessor that applies a digitally coded signal to a digital-to-analog (D/A) converter. An output voltage of the D/A converter is applied via a power amplifier to the compensating coil.

In the power amplifier, a differential current sense arrangement is used to control a voltage developed across a current sense resistor that is coupled in series with the compensating coil. Thereby, the current in the compensating coil is made independent of the value of the resistance of the compensating coil. This allows Z coils with significantly differing resistances to achieve identical rotation ranges.

In carrying out an inventive feature, a pair of differential output signals of a corresponding pair of DAC's fabricated in an integrated circuit (IC) on a common substrate are coupled to corresponding inverting and non-inverting inputs of the power amplifier. Such arrangement facilitates tracking between the pair of differential output signals.

During a degaussing interval, the pair of DAC's are programmed to convert the same digital value, for example a mid-range value. Because of the tracking between the pair of differential output signals, advantageously, accurate zero current is produced in the compensating coil, during the degaussing interval. Outside the degaussing interval, one DAC output signal may remain at the mid-range value while the other one may be adjusted to either a higher or a lower value as required for the aforementioned earth magnetic field compensation.

SUMMARY OF THE INVENTION

A magnetic field compensation apparatus, embodying an inventive feature includes a first digital-to-analog converter responsive to a digitally encoded signal containing magnetic field compensation information for generating a first analog signal containing the magnetic field compensation information from the digitally encoded signal. A magnetic field compensation winding is positioned on a cathode ray tube. An amplifier is responsive to the first analog signal and having an output that is coupled to the magnetic field compensation winding for producing a current in the magnetic field compensation winding. The current produces a magnetic field in a beam path of the cathode ray tube that compensates for an ambient magnetic field. A second digital-to-analog converter generates a second analog signal that is coupled to an input of the amplifier that varies the current in accordance with the second analog signal.

DETAILED DESCRIPTION OF THE PREFERRED EMBODIMENT

Figure 1A:
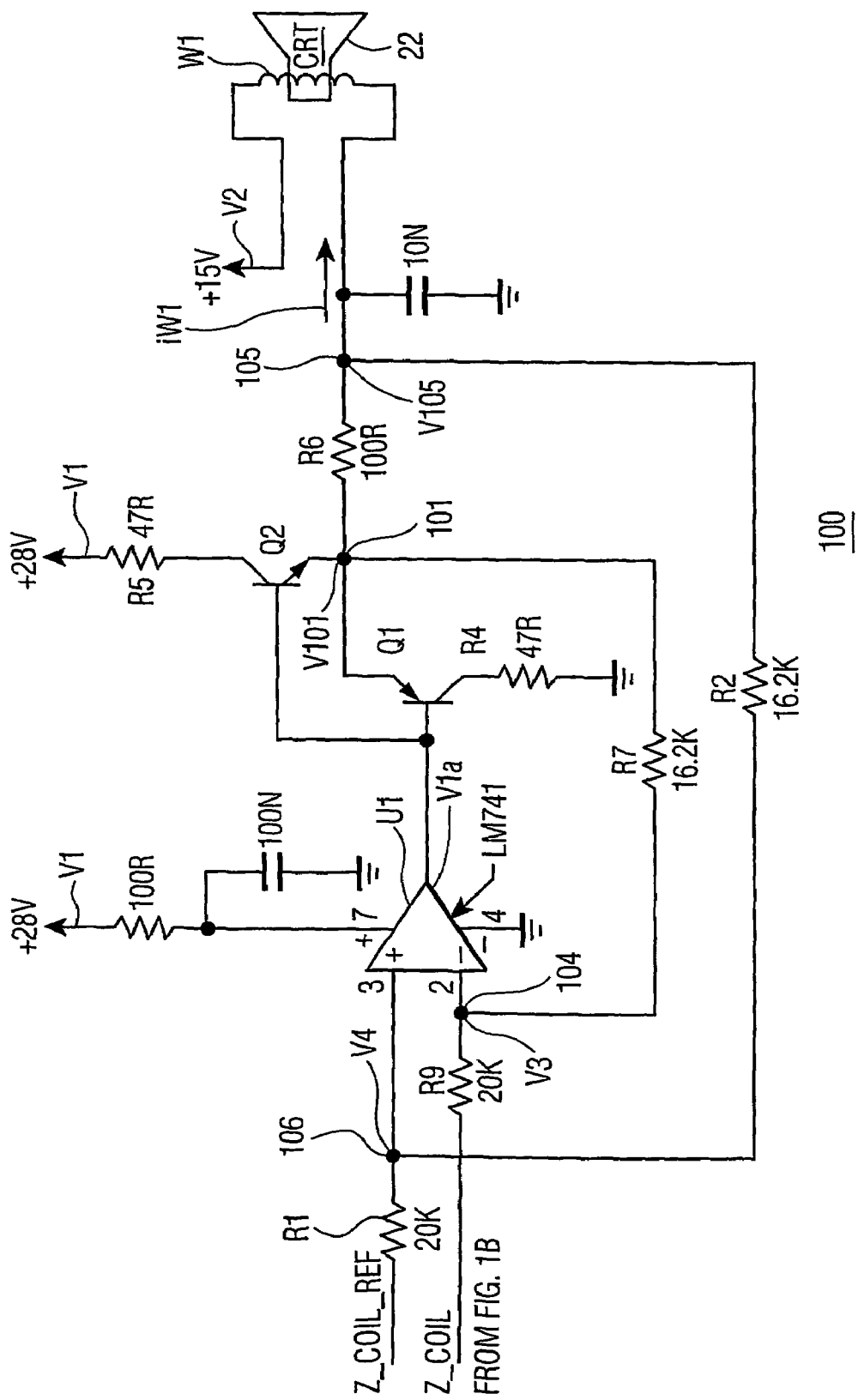
FIGS. 1A and 1B illustrate a bus controlled Z-axis or tilt compensation arrangement,embodying an aspect of the invention, for a video display.
Figure 1B:
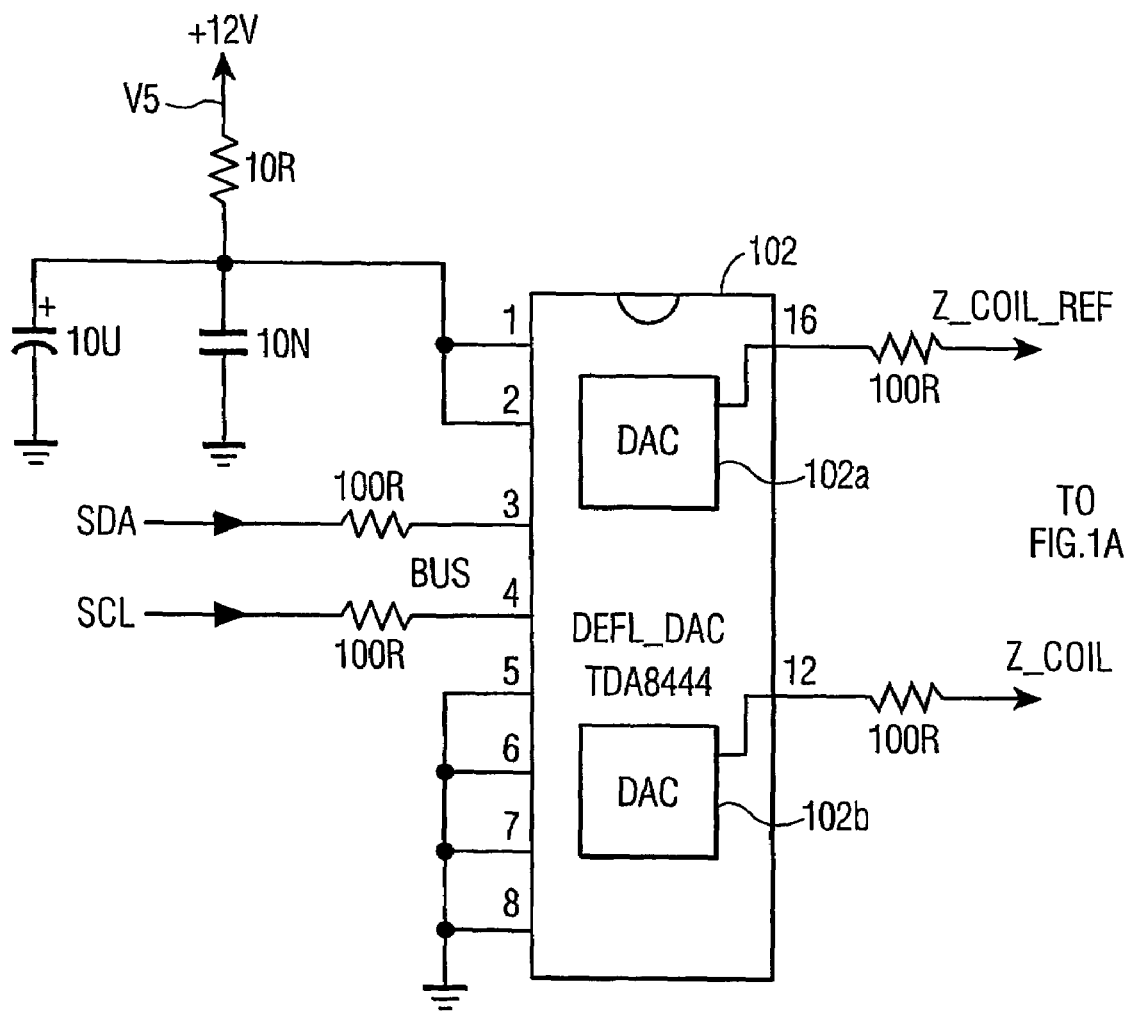

FIGS. 1A and 1B illustrate a bus controlled Z-axis or tilt compensation arrangement 100, embodying an aspect of the invention, for a video display. An output signal Z-COIL-REF of a conventional digital-to-analog converter (DAC) 102a of FIG. 1B is coupled via a resistor R1 of FIG. 1A to a non-inverting input terminal 106 of an operational amplifier U1. An output signal Z-COIL of a conventional DAC 102b is coupled via a resistor R9 to an inverting input terminal 104 of operational amplifier U1. Each of DAC 102a and DAC 102b of FIG. 1B is responsive to a digitally coded signal 103, developed on an I²C bus BUS, and generates the corresponding output signal Z-COIL-REF or Z-COIL, in accordance with the digital value of digitally coded signal 103.

An output terminal U1a of amplifier U1 of FIG. 1A is coupled to a base electrode of an emitter follower PNP transistor Q1 that is capable of sinking current at its emitter. Output terminal U1a is also coupled to a base electrode of an emitter follower NPN transistor Q2 that is capable of sourcing current at its emitter. The collector electrode of transistor Q1 is coupled to a common potential or ground via a current limiting resistor R4. The collector electrode of transistor Q2 is coupled to a supply voltage V1 of amplifier U1 via a current limiting resistor R5.

A junction terminal 101, between the emitters of transistors Q1 and Q2, is coupled via a feedback resistor R7 to inverting input terminal 104 of amplifier U1. A terminal 105 of a current sense resistor R6 is coupled via a feedback resistor R2 to non-inverting input terminal 106 of amplifier U1. Feedback resistors R7 and R2 cause a voltage V3 at inverting input terminal 104 to be equal to a voltage V4 at non-inverting input terminal 106. A difference between a voltage V101 developed at terminal 101 and a voltage V105 developed at terminal 105 is controlled in a feedback manner by a difference between signals Z-COIL-REF and Z-COIL.

Junction terminal 101, formed between the emitters of transistors Q1 and Q2, is coupled via current sensing resistor R6 to a compensating or Z coil W1. Coil W1 acts as a transducer for producing a field in a vicinity of a beam in a cathode ray tube (CRT) 22. The operation of coil W1 for compensating the earth's magnetic field is well known, as discussed in, for example, U.S. Pat. No. 5,015,915 in the names of Hartmann et al. A second end terminal of coil W1 is coupled to a supply voltage V2 that is approximately one half of supply voltage V1.

When a voltage V101 at terminal 101 is more positive than voltage V2, a current iW1 in coil W1 is positive. Conversely, when voltage V101 is less positive than voltage V2, current iW1 in coil W1 is negative. Therefore, the two polarities of current iW1 are obtained using supply voltages V1 and V2 that are both positive voltages.

A differential current sense arrangement formed by resistors R7 and R2 is used to control the voltage difference between voltages V101 and V105 developed across current sense resistor R6 that is coupled in series with compensating coil W1. Thereby, current iW1 in compensating coil W1 is made independent of the value of an inherent resistance of compensating coil W1. Advantageously, this allows Z coils with significantly differing resistances to achieve identical rotation ranges.

The pair of differential output signals Z-COIL-REF and Z-COIL of DAC 102a and DAC 102b of FIG. 1B, fabricated in an integrated circuit (IC) 102 of the type TDA8444 on a common substrate, are coupled to non-inverting and inverting inputs 106 and 104, respectively, of amplifier U1 of FIG. 1A. A supply voltage V5 is also coupled in common to DAC 102a and to DAC 102b. Such arrangement facilitates tracking between the pair of differential output signals Z-COIL-REF and Z-COIL. For example, signal Z-COIL may contain magnetic field compensation information; whereas, signal Z-COIL-REF may not contain any magnetic field compensation information. Instead, signal Z-COIL-REF may track variation in signal Z-COIL introduced by temperature variations, variations of supply voltage V5 or variations related to component aging of IC 102. Thereby, compensation by common mode rejection is, advantageously, provided.

During a degaussing interval, not shown, the pair of DAC 102a and DAC 102b of FIG. 1B are programmed to convert the same digital value, for example a mid-range value of signal 103. Because of the tracking between the pair of differential output signals Z-COIL-REF and Z-COIL, advantageously, accurate zero current iW1 of FIG. 1A is produced in compensating coil W1, during the degaussing interval. Outside the degaussing interval, one of output signals Z-COIL-REF and Z-COIL may remain at the mid-range value while the other one may be adjusted to either a higher or a lower value as required for the aforementioned earth magnetic field compensation.

What is claimed is:

1. A magnetic field compensation apparatus, comprising:
    a first digital-to-analog converter responsive to a digitally encoded signal containing magnetic field compensation information; for generating a first analog signal containing the magnetic field compensation information from said digitally encoded signal;
    a magnetic field compensation winding positioned on a cathode ray tube;
    an amplifier responsive to said first analog signal and having an output that is coupled to said magnetic field compensation winding for producing a current in said magnetic field compensation winding, said current producing a magnetic field in a beam path of said cathode ray tube that compensates for an ambient magnetic field; and
    a second digital-to-analog converter for generating a second analog signal that is coupled to an input of said amplifier that varies said current in accordance with said second analog signal;
    wherein said compensation winding is coupled to a source of a supply voltage, wherein a polarity of said current varies in accordance with a difference between an output voltage of said amplifier and said supply voltage and wherein a polarity of said amplifier output voltage remains the same both when said current is at a first polarity and when said current is at a polarity that is opposite to said first polarity.

2. The apparatus according to claim 1 wherein said second analog signal tracks variations in said first analog signal for providing error compensation and wherein said magnetic field compensation current is controlled in accordance with a difference between said first and second analog signals.

3. The apparatus according to claim 1, wherein said digital-to-analog converters are separate units contained in a single integrated circuit.

4. The apparatus according to claim 1, wherein said digital-to-analog converters are energized from a common supply voltage.

5. The apparatus according to claim 1, wherein said amplifier comprises a differential, input stage, wherein said first analog signal is coupled to one of an inverting input and a non-inverting input of said amplifier and wherein said second analog signal is coupled to the other one of said inverting and non-inverting inputs of said amplifier.

6. The apparatus according to claim 1, further comprising a current negative feedback path coupled to said amplifier to reduce a dependency of said current on an impedance of said winding.

7. A magnetic field compensation apparatus, comprising:
    a first digital-to-analog converter responsive to a digitally encoded signal containing magnetic field compensation information; for generating a first analog signal containing the magnetic field compensation information from said digitally encoded signal;
    a magnetic field compensation winding positioned on a cathode ray tube;
    an amplifier responsive to said first analog signal and having an output that is coupled to said magnetic field compensation winding for producing a current in said magnetic field compensation winding, said current producing a magnetic field in a beam path of said cathode ray tube that compensates for an ambient magnetic field;
    a second digital-to-analog converter for generating a second analog signal that is coupled to an input of said amplifier that varies said current in accordance with said second analog signal;
    a source of a second digitally encoded signal coupled to an input of said second digital-to-analog converter, wherein, during a degaussing interval, said value of said first and second digitally encoded signals are made to be equal for preventing the generation of said current.

* * * * *